US011621891B1

(12) United States Patent
Chou et al.

(10) Patent No.: US 11,621,891 B1
(45) Date of Patent: Apr. 4, 2023

(54) SYSTEMS AND METHODS FOR ROUTING NETWORK DATA BASED ON SOCIAL CONNECTIONS OF USERS

(71) Applicant: Meta Platforms, Inc., Menlo Park, CA (US)

(72) Inventors: David Shu-Hao Chou, Menlo Park, CA (US); Tianyin Xu, Urbana, IL (US); Kaushik Veeraraghavan, Bainbridge Island, WA (US); Andrew John Newell, Fremont, CA (US); Sonia Margulis, Mountain View, CA (US); Lin Xiao, Redwood City, CA (US); Pol Mauri Ruiz, Mountain View, CA (US); Justin James Meza, San Jose, CA (US); Kiryong Ha, Redmond, WA (US); Shruti Padmanabha, San Francisco, CA (US); Kevin Burton Cole, Menlo Park, CA (US); Dmitri Perelman, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 427 days.

(21) Appl. No.: 16/849,585

(22) Filed: Apr. 15, 2020

Related U.S. Application Data

(60) Provisional application No. 62/869,533, filed on Jul. 1, 2019.

(51) Int. Cl.
*H04L 12/26* (2006.01)
*H04L 41/12* (2022.01)
(Continued)

(52) U.S. Cl.
CPC ............ *H04L 41/12* (2013.01); *G06K 9/6224* (2013.01); *G06Q 50/01* (2013.01); *H04L 45/48* (2013.01);
(Continued)

(58) Field of Classification Search
None
See application file for complete search history.

(56) References Cited

U.S. PATENT DOCUMENTS 6,434,664 B1   8/2002   Buch et al.
7,324,555 B1   1/2008   Chen et al.
(Continued)

OTHER PUBLICATIONS

Notice of Allowance received for U.S. Appl. No. 16/806,975 dated Oct. 20, 2020, 34 pages.
(Continued)

*Primary Examiner* — Zewdu A Beyen
(74) *Attorney, Agent, or Firm* — Greenberg Traurig, LLP

(57) ABSTRACT

A disclosed computer-implemented method may include partitioning, based on a social graph representative of social connections among a plurality of users of a social networking system, the plurality of users into a plurality of user buckets. Each user bucket may include at least one user of the social networking system. The method may further include selecting a set of user buckets from the plurality of user buckets, assigning the set of user buckets to a data center included in a networking infrastructure, and routing data sent from a user device associated with a user included in the set of user buckets to the data center. Various other methods, systems, and computer-readable media are also disclosed.

20 Claims, 6 Drawing Sheets

(51) Int. Cl.
| | |
|---|---|
| G06Q 50/00 | (2012.01) |
| H04L 45/48 | (2022.01) |
| G06K 9/62 | (2022.01) |
| H04L 47/20 | (2022.01) |
| H04L 47/2441 | (2022.01) |
| H04L 67/568 | (2022.01) |

(52) U.S. Cl.
CPC .......... *H04L 47/20* (2013.01); *H04L 47/2441* (2013.01); *H04L 67/568* (2022.05)

(56) References Cited

U.S. PATENT DOCUMENTS

| | | | |
|---|---|---|---|
| 7,797,064 | B2 | 9/2010 | Loomis et al. |
| 9,798,789 | B2* | 10/2017 | Lindstrom ............ G06F 16/957 |
| 10,700,964 | B1 | 6/2020 | Yuan |
| 2004/0138948 | A1 | 7/2004 | Loomis |
| 2006/0206635 | A1 | 9/2006 | Alexander et al. |
| 2007/0121526 | A1 | 5/2007 | Sung et al. |
| 2009/0183216 | A1 | 7/2009 | Crosby |
| 2009/0288104 | A1 | 11/2009 | Bagepalli et al. |
| 2009/0313300 | A1 | 12/2009 | Dettori et al. |
| 2012/0173754 | A1 | 7/2012 | Dalrymple et al. |
| 2016/0261493 | A1 | 9/2016 | Li |
| 2018/0084052 | A1* | 3/2018 | Trachy ................ H04L 67/1097 |
| 2019/0280979 | A1 | 9/2019 | Jain et al. |

OTHER PUBLICATIONS

"Azure Front Door Service Documentation", URL: https://docs.microsoft.com/en-us/azure/frontdoor/, Updated URL: https://github.com/MicrosoftDocs/azure-docs/tree/10f930f4157d9d9238b7ca1fd9a8871cbe518ffd/articles/frontdoor, revised on Jun. 1, 2019, 2 pages.

Adya et al., "Slicer: Auto-Sharding for Datacenter Applications", Proceedings of the 12th USENIX Symposium on Operating Systems Design and Implementation (OSDI), Nov. 2-4, 2016, 17 pages.

Annamalai et al., "Sharding the Shards: Managing Datastore Locality at Scale with Akkio", Proceedings of the 13th USENIX Symposium on Operating Systems Design and Implementation (OSDI), Oct. 8-10, 2018, 17 pages.

Araujo et al., "Balancing on the Edge: Transport Affinity without Network State", Proceedings of the 15th USENIX Symposium on Networked Systems Design and Implementation (NSDI), Apr. 9-11, 2018, 15 pages.

Bethea et al., "Managing Load", The Site Reliability Workbook: Practical Ways to Implement SRE, Chapter 11, O'Reilly Media Inc, Aug. 2018, 14 pages.

Cherkasova et al., "Session Based Admission Control: A Mechanism for Improving the Performance of an Overloaded Web Server", Tech. Rep. HPL-98-119, Hewlett-Packard Company, Jun. 1998, pp. 1-40.

Cuervo, Alejandro Forero, "Handling Overload", URL: https://landing.google.com/sre/sre-book/chapters/handling-overload/, Site Reliability Engineering: How Google Runs Production Systems, Chapter 21, O'Reilly Media Inc., Apr. 2016, 9 pages.

Cuervo, Alejandro Forero, "Load Balancing in the Datacenter", URL: https://landing.google.com/sre/sre-book/chapters/load-balancing-datacenter/, Site Reliability Engineering: How Google Runs Production Systems, Chapter 20, O'Reilly Media Inc., Apr. 2016, 11 pages.

Eisenbud et al., "Maglev: A Fast and Reliable Software Network Load Balancer", Proceedings of the 13th USENIX Symposium on Networked Systems Design and Implementation (NSDI), Mar. 16-18, 2016, 14 pages.

Flavel et al., "FastRoute: A Scalable Load-Aware Anycast Routing Architecture for Modern CDNs", Proceedings of the 12th USENIX Symposium on Networked Systems Design and Implementation (NSDI), May 4-6, 2015, 15 pages.

Ford et al., "Availability in Globally Distributed Storage Systems", Proceedings of the 9th USENIX Conference on Operating Systems Design and Implementation (OSDI), Oct. 2010, pp. 1-14.

Gandhi et al., "Rubik: Unlocking the Power of Locality and End-point Flexibility in Cloud Scale Load Balancing", Proceedings of the 2015 USENIX Annual Technical Conference (USENIX ATC), Jul. 8-10, 2015, 13 pages.

Gandhi et al., "A Highly Available Layer-7 Load Balancer", Proceedings of the 11th European Conference on Computer Systems (EuroSys), Article No. 21, Apr. 2016, 4 pages.

Gandhi et al., "Duet: Cloud Scale Load Balancing with Hardware and Software", Proceedings of the 2014 ACM SIGCOMM Conference (SIGCOMM), Aug. 17-22, 2014, 12 pages.

Ganjam et al., "C3: Internet-Scale Control Plane for Video Quality Optimization", Proceedings of the 12th USENIX Symposium on Networked Systems Design and Implementation (NSDI), May 4-6, 2015, 15 pages.

Goldenberg et al., "Optimizing Cost and Performance for Multihoming", Proceedings of the ACM SIGCOMM Conference (SIGCOMM), Aug. 3-Sep. 3, 2004, 14 pages.

Govindan et al., "Evolve or Die: High-Availability Design Principles Drawn from Googles Network Infrastructure", Proceedings of the 2016 ACM SIGCOMM Conference (SIGCOMM), Aug. 22-26, 2016, 15 pages.

Gunawi et al., "What Bugs Live in the Cloud? A Study of 3000+ Issues in Cloud Systems", Proceedings of the 5th ACM Symposium on Cloud Computing (SoCC), Nov. 3-5, 2014, pp. 1-14.

Gunawi et al., "Why Does the Cloud Stop Computing? Lessons from Hundreds of Service Outages", Proceedings of the 7th ACM Symposium on Cloud Computing (SoCC), Oct. 5-7, 2016, pp. 1-16.

Gunawi et al., "Fail-Slow at Scale: Evidence of Hardware Performance Faults in Large Production Systems", Proceedings of the 16th USENIX Conference on File and Storage Technologies (FAST), Feb. 12-15, 2018, 15 pages.

Hong et al., "Achieving High Utilization with Software-driven WAN", Proceedings of the 2013 ACM SIGCOMM Conference (SIGCOMM), Aug. 12-16, 2013, pp. 15-26.

Hong et al., "B4 and After: Managing Hierarchy, Partitioning, and Asymmetry for Availability and Scale in Google's Software-defined WAN", Proceedings of the ACM SIGCOMM Conference (SIGCOMM), Aug. 20-25, 2018, pp. 74-87.

Hunt et al., "ZooKeeper: Wait-free Coordination for Internet-scale Systems", Proceedings of the USENIX Conference on USENIX Annual Technical Conference (USENIX ATC), Jun. 2010, pp. 1-14.

Jain et al., "B4: Experience with a Globally-deployed Software Defined WAN", Proceedings of the ACM SIGCOMM Conference (SIGCOMM), Aug. 12-16, 2013, 12 pages.

Jiang et al., "Cooperative Content Distribution and Traffic Engineering in an ISP Network", Proceedings of the 11th International Joint Conference on Measurement and Modeling of Computer Systems (SIGMETRICS), Jun. 15-19, 2009, pp. 1-12.

Jimenez et al., "Building Express Backbone: Facebook's new long-haul networks", URL: https://code.fb.com/data-center-engineering/building-express-backbone-facebook-s-new-long-haul-network/, Data Center Engineering, Networking & Traffic, May 1, 2017, 7 pages.

Julienne, Theo, "GLB: GitHub's open source load balancer", URL: https://githubengineering.com/glb-director-open-source-load-balancer/, Aug. 8, 2018, 16 pages.

Kabiljo et al., "Social Hash Partitioner: A Scalable Distributed Hypergraph Partitioner", Journal Proceedings of the VLDB Endowment, vol. 10, No. 11, Aug. 2017, pp. 1418-1429.

Kang et al., "Efficient Traffic Splitting on Commodity Switches", Proceedings of the 11th ACM Conference on Emerging Networking Experiments and Technologies (CoNEXT), Dec. 1-4, 2015, 13 pages.

Keeton et al., "Designing for Disasters", Proceedings of the 3rd USENIX Conference on File and Storage Technologies (FAST), Mar. 31-Apr. 2, 2004, 15 pages.

Khalidi, Yousef, "How Microsoft builds its fast and reliable global network", URL: https://azure.microsoft.com/en-us/blog/how-microsoft-builds-its-fast-and-reliable-global-network/, Mar. 2017, 9 pages.

Krishnan, Kripa, "Weathering the Unexpected", Communications of the ACM (CACM) vol. 55, No. 11, Nov. 2012, pp. 48-52.

(56) References Cited

OTHER PUBLICATIONS

Lewandowski, Piotr, "Load Balancing at the Frontend", URL: https://landing.google.com/sre/sre-book/chapters/load-balancing-frontend/, Site Reliability Engineering: How Google Runs Production Systems, Chapter 19, O'Reilly Media Inc., Apr. 2016, 5 pages.

Liu et al., "Efficiently Delivering Online Services over Integrated Infrastructure", Proceedings of the 13th USENIX Symposium on Networked Systems Design and Implementation (NSDI), Mar. 16-18, 2016, 15 pages.

Liu et al., "Optimizing Cost and Performance for Content Multihoming", Proceedings of the ACM SIGCOMM Conference (SIGCOMM), Aug. 13-17, 2012, pp. 371-382.

Lupi, Robeto, "Monarch, Google's Planet Scale Monitoring Infrastructure", URL: https://www.youtube.com/watch?v=LlvJdK1xsl4, Dec. 12, 2016, 1 page.

Mallapur, Anil, "TrafficShift: Load Testing at Scale", URL: https://engineering.linkedin.com/blog/2017/05/trafficshift--load-testing-at-scale, May 11, 2017, 4 pages.

Maurer, Ben, "Fail at Scale: Reliability in the Face of Rapid Change", Communications of the ACM (CACM), vol. 58, No. 11, Nov. 2015, pp. 1-17.

Miao et al., "SilkRoad: Making Stateful Layer-4 Load Balancing Fast and Cheap Using Switching ASICs", Proceedings of the ACM SIGCOMM Conference (SIGCOMM), Aug. 21-25, 2017, pp. 15-28.

Michelsen, Martin, "Continuous deployment at Quora", URL: http://engineering.quora.com/Continuous-Deployment-at-Quora, Apr. 29, 2013, 4 pages.

Mogul et al., "Thinking about Availability in Large Service Infrastructures", Proceedings of the 16th Workshop on Hot Topics in Operating Systems (HotOS XVI), May 8-10, 2017, pp. 12-17.

Narayana et al., "To Coordinate or Not to Coordinate? Wide-Area Traffic Management for Data Centers", Tech. Rep. TR-998-15, Dec. 2012, pp. 1-19.

Olteanu et al., "Stateless Datacenter Load-balancing with Beamer", Proceedings of the 15th USENIX Symposium on Networked Systems Design and Implementation (NSDI), Apr. 9-11, 2018, 16 pages.

Oppenheimer et al., "Why Do Internet Services Fail, and What Can Be Done About It?", Proceedings of the 4th Conference on USENIX Symposium on Internet Technologies and Systems (USITS), Mar. 2003, 15 pages.

Patel et al., "Ananta: Cloud Scale Load Balancing", Proceedings of the ACM SIGCOMM Conference, Aug. 12-16, 2013, pp. 207-218.

Patterson et al., "Recovery-Oriented Computing (ROC): Motivation, Definition, Techniques, and Case Studies", Tech. Rep. UCB//CSD-02-1175, Mar. 2002, 16 pages.

Pelkonen et al., "Gorilla: A Fast, Scalable, In-Memory Time Series Database", Proceedings of the 41st International Conference on Very Large Data Bases (VLDB), Aug. 31-Sep. 4, 2015, pp. 1816-1827.

Ray, Shaun, "New-AWS Global Accelerator for Availability and Performance", URL: https://aws.amazon.com/global-accelerator/, Nov. 26, 2018, 6 pages.

Rossi et al., "Continuous Deployment of Mobile Software at Facebook (Showcase)", Proceedings of the 24th ACM SIGSOFT International Symposium on Foundations of Software Engineering (FSE), Nov. 13-18, 2016, pp. 12-23.

Schlinker et al., "Engineering Egress with Edge Fabric: Steering Oceans of Content to the World", Proceedings of the ACM SIGCOMM Conference (SIGCOMM), Aug. 21-25, 2017, 14 pages.

Shalita et al., "Social Hash: An Assignment Framework for Optimizing Distributed Systems Operations on Social Networks", Proceedings of the 13th USENIX Symposium on Networked Systems Design and Implementation (NSDI), Mar. 16-18, 2016, 15 pages.

Sherman et al. "ACMS: The Akamai Configuration Management System", Proceedings of the 2nd Conference on Symposium on Networked Systems Design and Implementation (NSDI), May 2005, 14 pages.

Sommermann et al., "Introducing Proxygen, Facebook's C++ HTTP framework", URL: https://code.facebook.com/posts/1503205539947302, Networking & Traffic, Production Engineering, Nov. 5, 2014, 5 pages.

Tang et al., "Holistic Configuration Management at Facebook", Proceedings of the 25th Symposium on Operating Systems Principles (SOSP), Oct. 4-7, 2015, pp. 328-343.

Savor et al., "Continuous Deployment at Facebook and OANDA", Proceedings of the 38th IEEE/ACM International Conference on Software Engineering Companion (ICSE), May 14-22, 2016, pp. 21-30.

Treynor et al., "The Calculus of Service Availability", Communications of the ACM (CACM), vol. 60, No. 9, Sep. 2017, pp. 42-47.

Veeraraghavan et al., "Kraken: Leveraging Live Traffic Tests to Identify and Resolve Resource Utilization Bottlenecks in Large Scale Web Services", Proceedings of the 12th USENIX Symposium on Operating Systems Design and Implementation (OSDI), Nov. 2-4, 2016, 19 pages.

Veeraraghavan et al., "Maelstrom: Mitigating Datacenter-level Disasters by Draining Interdependent Traffic Safely and Efficiently", Proceedings of the 13th USENIX Symposium on Operating Systems Design and Implementation (OSDI), Oct. 8-10, 2018, 18 pages.

Welsh et al., "Adaptive Overload Control for Busy Internet Servers", Proceedings of the 4th Conference on USENIX Symposium on Internet Technologies and Systems (USITS), Mar. 2003, 14 pages.

Wendell et al., "DONAR: Decentralized Server Selection for Cloud Services", Proceedings of the ACM SIGCOMM Conference (SIGCOMM), Aug. 30-Sep. 3, 2010, 12 pages.

Xu et al., "Joint Request Mapping and Response Routing for Geo-distributed Cloud Services", Proceedings of the 32nd IEEE International Conference on Computer Communications (INFOCOM), Apr. 2013, 9 pages.

Yap et al., "Taking the Edge off with Espresso: Scale, Reliability and Programmability for Global Internet Peering", Proceedings of the 2017 ACM SIGCOMM Conference (SIGCOMM), Aug. 21-25, 2017, pp. 432-445.

Zhang et al., "Optimizing Cost and Performance in Online Service Provider Networks", Proceedings of the 7th USENIX Symposium on Networked Systems Design and Implementation (NSDI), Apr. 2010, pp. 1-15.

Zhou et al., "Overload Control for Scaling WeChat Microservices", Proceedings of the ACM Symposium on Cloud Computing (SoCC), Oct. 11-13, 2018, 13 pages.

\* cited by examiner

Method 300

```
                    ( Start )
                        │
                        ▼
┌─────────────────────────────────────────────────────────────┐
│ Partition, based on a social graph representative of social │
│ connections among a plurality of users of a social          │
│ networking system, the plurality of users into a plurality  │
│ of user buckets, each user bucket comprising at least one   │
│ user of the social networking system                        │
│                           310                               │
└─────────────────────────────────────────────────────────────┘
                        │
                        ▼
┌─────────────────────────────────────────────────────────────┐
│     Select a set of user buckets from the plurality of      │
│                        user buckets                         │
│                           320                               │
└─────────────────────────────────────────────────────────────┘
                        │
                        ▼
┌─────────────────────────────────────────────────────────────┐
│ Assign the set of user buckets to a data center included in │
│                  a networking infrastructure                │
│                           330                               │
└─────────────────────────────────────────────────────────────┘
                        │
                        ▼
┌─────────────────────────────────────────────────────────────┐
│ Route data sent from a user device associated with a user   │
│   included in the set of user buckets to the data center    │
│                           340                               │
└─────────────────────────────────────────────────────────────┘
                        │
                        ▼
                     ( End )
```

*FIG. 3*

Listing 400

$B \leftarrow$ list of buckets
$D \leftarrow$ list of data center names
$W_B \leftarrow$ bucket weights
$W_D \leftarrow$ data center weights
$S \leftarrow$ number of segments
$T \leftarrow \emptyset$
for $d \in D$ do
    $P \leftarrow$ PermutationWithSeed($S, d$)
    for $b \in B$ do
        segment $\leftarrow$ Floor$\left(\frac{b*|B|}{S}\right)$
        $T \leftarrow T \cup \langle P[\text{segment}], d, b \rangle$
    end for
end for
SortLexicographically($T$)
$A \leftarrow \emptyset$
for $\langle \text{preference}, d, b \rangle \in T$ do
    if $b \notin A \wedge W_D[d] > 0$ then
        $A[b] \leftarrow d$
        $W_D[d] \leftarrow W_D[d] - W_B[b] * \frac{\sum W_D}{\sum W_B}$
    end if
end for
return $A$

*FIG. 4*

SYSTEMS AND METHODS FOR ROUTING NETWORK DATA BASED ON SOCIAL CONNECTIONS OF USERS

CROSS REFERENCE TO RELATED APPLICATION

This application claims the benefit of U.S. Provisional Patent Application No. 62/869,533, filed Jul. 1, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a flow diagram of an example method for routing network data based on social connections of users.

FIG. 4 is a listing of pseudocode describing at least part of an example Consistent Mapping algorithm as described herein.

Figure 1:
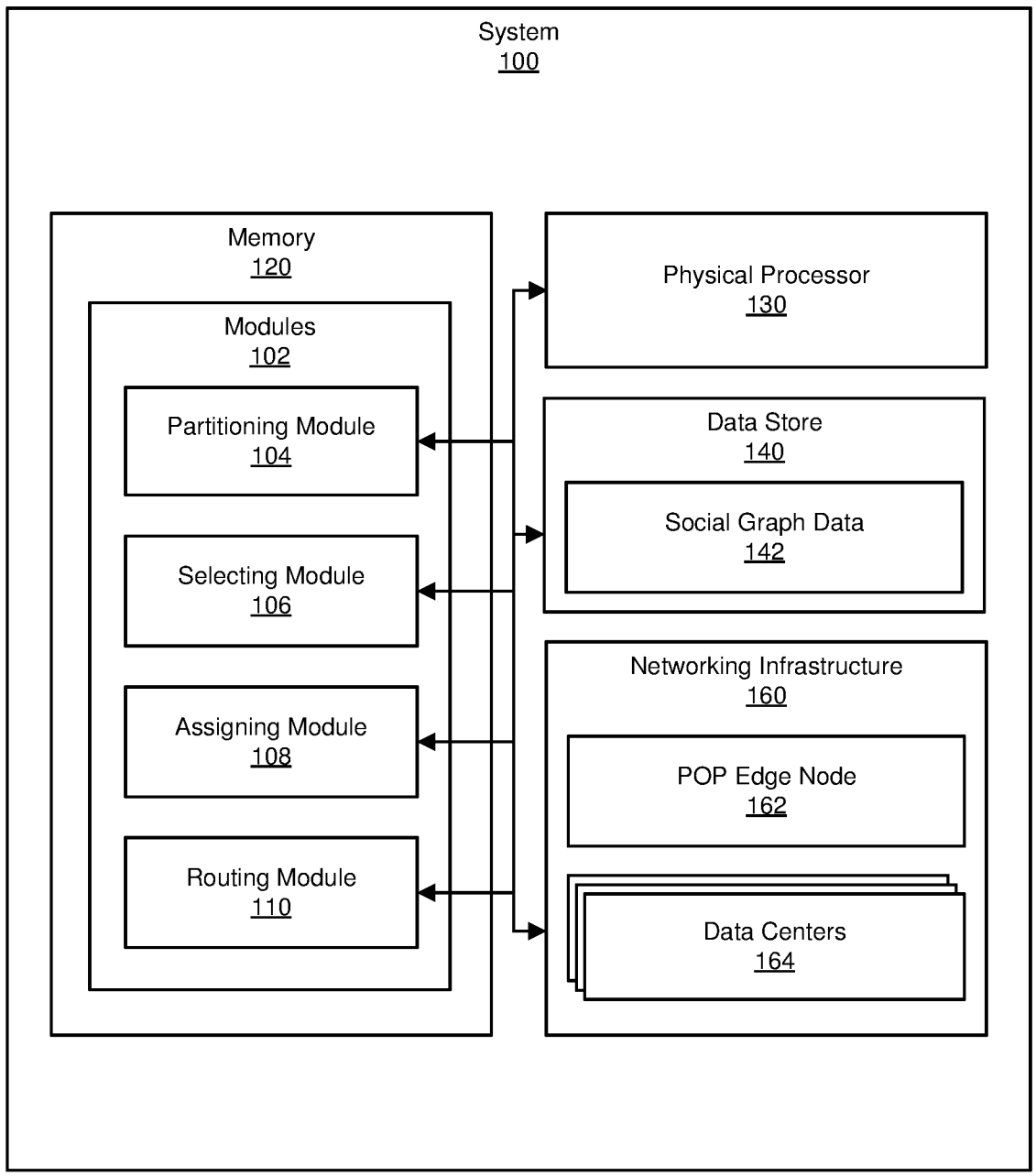
FIG. 1 is a block diagram of an example system for routing network data based on social connections of users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern Internet services may operate on a bipartite architecture with one or more data centers interconnecting one or more edge nodes, also known as points of presence (POP). Data centers may host a majority of computing and storage capacity of most Internet services. Edge nodes may be much smaller in size (e.g., computing resources, storage capacity, physical dimensions, etc.) and may be physically or logically located closer to end users.

Edge nodes may cache and/or distribute static content such as image and/or video data. In case of a miss in an edge node (i.e., the edge node is unable to fulfill a user request for static content), static content may be fetched from data centers via wide area network (WAN) traffic engineering solutions. User requests for dynamic content, such as real-time messages and search queries, may be a significant source of network traffic from edge nodes to data centers. It may be a common practice for major Internet services to build private backbone networks or peering links that connect edge nodes to data centers to avoid unpredictable performance and congestion on public WANs.

Conventional routing solutions may include a static mapping to route user requests from edge nodes to data centers. Unfortunately, such static mappings may become increasingly difficult to maintain as a particular Internet service expands to a global scale. For example, if a service's popularity and capacity needs outpace capacity availability, the service provider may be unable to service all user requests. Concurrently, some locales may experience fast or explosive growth, whereas other locales may experience slower growth. A static edge-to-data-center mapping may result in a capacity shortage in data centers serving some edges and over-provisioned capacity in other data centers. This imbalance may result in load shedding or failures during peak load times.

Additionally, as a service provider's products evolve, the nature of user requests may change. For example, some products may provide an interactive experience that may require or be optimized for a "sticky" routing between a user's device and the service provider's data centers. This stickiness may reduce the effectiveness of a static mapping to manage user traffic.

Furthermore, the underlying physical infrastructure of an architecture may constantly evolve as server generations may be updated, capacity may be added or removed, and networking infrastructure may be improved. A static mapping may be insufficiently flexible and unable to adapt to such infrastructure evolution. Moreover, as an infrastructure footprint grows, inevitable network failures, power loss, software misconfiguration, and other possible causes may result in some fraction of the edge and data center capacity becoming unavailable. A static edge-to-data-center routing strategy may be rigid and susceptible to failures when such operational issues may arise. Hence, the present disclosure identifies and addresses a need for new and improved methods of dynamically routing data in large-scale heterogeneous networks.

The present disclosure is generally directed to systems and methods for routing network data based on social connections of users. As will be explained in greater detail below, embodiments of the instant disclosure may improve routing of data within large-scale networking infrastructures by grouping traffic of highly connected users (e.g., highly connected within a social graph) and routing the traffic to the same data centers, leveraging locality of user traffic and improving cache hit rates and other backend optimizations.

An example embodiments of the instant disclosure may partition a plurality of users into a plurality of user buckets based on a social graph. The social graph may be representative of social connections among a plurality of users of a social networking system, and each user bucket may include at least one user of the social networking system. An example embodiment may also select a set of user buckets from the plurality of user buckets, assign the set of user buckets to a data center included in a networking infrastructure, and route data sent from a user device (e.g., a user's mobile phone, tablet, personal computer, and/or other computing device) associated with a user included in the set of user buckets to the data center.

As a simplified illustration, an example social graph may include three users of a social networking system, and an example networking infrastructure may include two data centers. The example social graph may indicate that a first user may be connected within the social networking system to a second user of the social networking system. For example, the first user and the second user may be "friends" within the social networking system. The example social graph may further indicate that a third user of the social networking system may not be connected to either the first user or the second user. An example embodiment of the systems and methods described herein may partition the example social graph into a first user bucket and a second user bucket. The first user bucket may include both the first user and the second user, and the second user bucket may include the third user.

The example embodiment may then select a set of user buckets that includes the first user bucket and may assign the set of user buckets (e.g., the first user bucket that includes the first user and the second user) to a first data center included in a networking infrastructure. The example embodiment may also select an additional set of user buckets that includes the second user bucket and may assign the additional set of user buckets (e.g., the second user bucket that includes the third user) to a second data center included in the networking infrastructure. The example embodiment may further route data sent from user devices associated with either the first user or the second user to the first data center, and may route data sent from user devices associated with the third user to the second data center.

Traffic that includes requests for similar content may have locality and may therefore benefit caching and other backend systems. Routing data based on social connections of users as described herein may bring in locality in traffic routing by routing traffic from highly connected users to the same data center. Such connection-aware routing may improve efficiency of caching systems and/or other optimizations, such as by improving cache hit rates and/or minimizing shard migration. Thus, the systems and methods described herein may achieve significant reductions in loads placed on and/or applied to storage systems (e.g., backend storage systems).

The following will provide, with reference to FIGS. 1-2 and 4-6, detailed descriptions of systems for routing network data based on social connections of users. Detailed descriptions of corresponding computer-implemented methods will also be provided in connection with FIG. 3.

FIG. 1 is a block diagram of an example system 100 for routing network data based on social connections of users. As illustrated in this figure, example system 100 may include one or more modules 102 for performing one or more tasks. As will be explained in greater detail below, modules 102 may include a partitioning module 104 that may partition, based on a social graph representative of social connections among a plurality of users of a social networking system, the plurality of users into a plurality of user buckets, each user bucket comprising at least one user of the social networking system.

Additionally, example system 100 and/or modules 102 may include a selecting module 106 that may select a set of user buckets from the plurality of user buckets and an assigning module 108 that may assign the set of user buckets to a data center included in a networking infrastructure. As further illustrated in FIG. 1, example system 100 and/or modules 102 may include a routing module 110 that may route data sent from a user device associated with a user included in the set of user buckets to the data center.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As also illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate routing network data based on social connections of users. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Further shown in FIG. 1, example system 100 may also include one or more data stores, such as data store 140, that may receive, store, maintain, and/or otherwise interact with data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a NoSQL database, a NewSQL database, and/or any other suitable organized collection of data.

In at least one example, data store 140 may include (e.g., store, host, access, maintain, etc.) social graph data 142. As will be explained in greater detail below, in some examples, social graph data 142 may include information including, representative of, and/or associated with one or more social graphs. In some examples, a "social graph" may represent one or more nodes that may be interconnected by one or more edges. Each node in the social graph may represent a user or object that can act on another node and/or that can be acted on by another node. An edge between two nodes in the social graph may represent a connection between the two nodes, which may result from one of the nodes performing an action that on the other node. For example, when a user identifies an additional user as a friend, example system 100 (e.g., one or more of modules 102) may generate an edge in the social graph connecting a node representing the first user and another node representing the additional user. The generated edge may have a connection type that may indicate that the users are friends. As various nodes interact with each other, one or more of modules 102 may add, remove, or otherwise modify edges connecting the various nodes to reflect the interactions.

System 100 may also include a networking infrastructure 160 that may include at least one POP edge node 162 and a plurality of data centers 164. As will be described in greater detail below, a POP edge node (e.g., POP edge node 162) may include one or more computing devices that may act as an end user portal for communication with other nodes in a networking infrastructure (e.g., networking infrastructure 160). In some examples, POP edge nodes may function as reverse proxies for terminating user connections physically, geographically, and/or logically close to internet service providers (ISPs) that may provide internet service to users. In additional or alternative examples, POP edge nodes may cache and/or distribute static content such as images and/or video.

As will be described in greater detail below, a data center (e.g., one or more of data centers 164) may include a set of routers and/or switches that may transport traffic between one or more servers according to a data center network architecture. In general, as noted above, POP edge nodes may cache and/or distribute static content such as image and/or video data. In case of a miss in a POP edge node (i.e., the POP edge node is unable to fulfill a user request for static content), static content may be fetched from data centers via wide area network (WAN) traffic engineering solutions. User requests for dynamic content, such as real-time messages and search queries, may be a significant source of network traffic from POP edge nodes to data centers.

Figure 2:
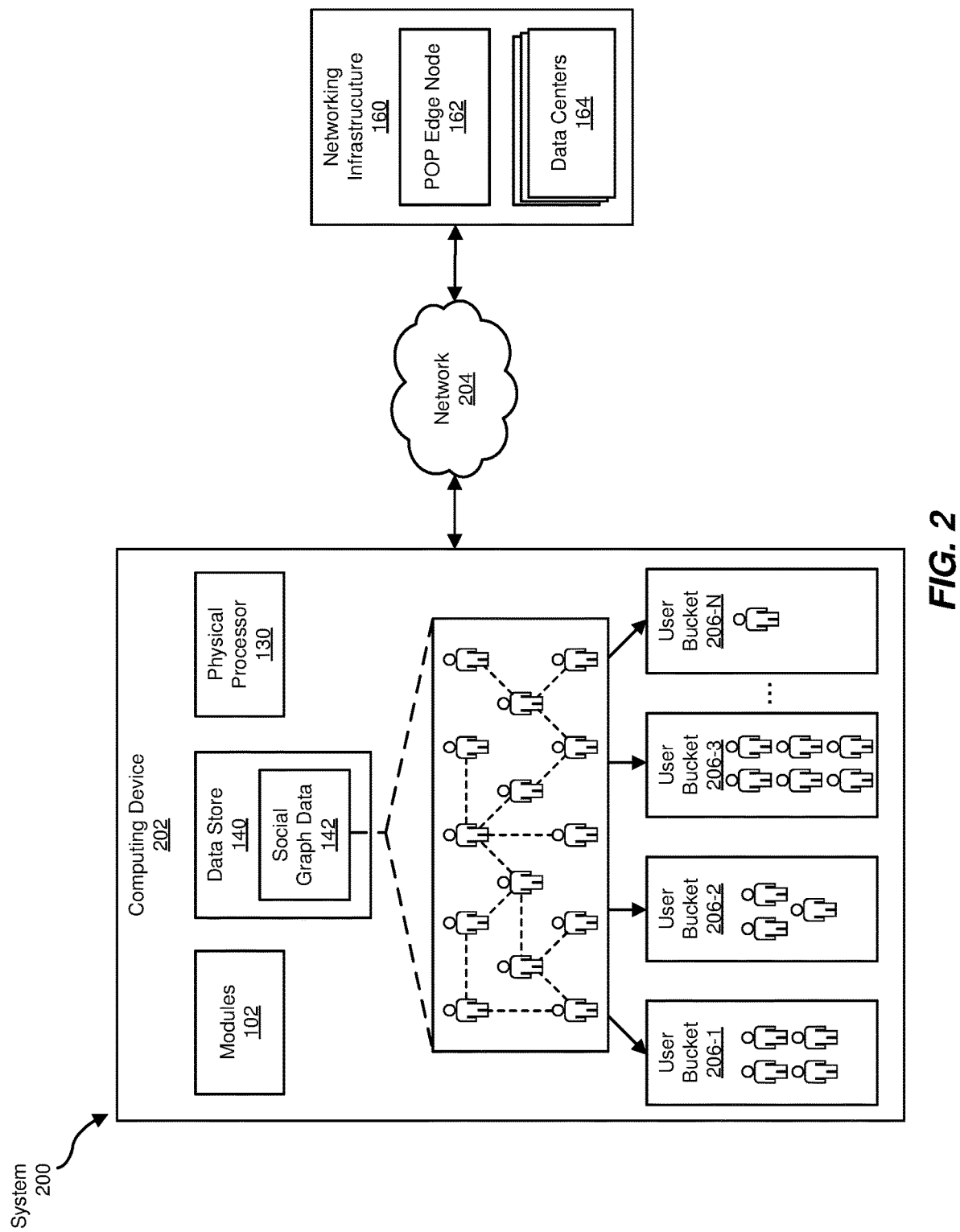
FIG. 2 is a block diagram of an example implementation of a system for routing network data based on social connections of users.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202 in communication with networking infrastructure 160, POP edge node 162, and/or one or more of data centers 164 via network 204. In at least one example, computing device 202 may be programmed with one or more of modules 102.

In at least one embodiment, one or more of modules 102 from FIG. 1 may, when executed by computing device 202, enable computing device 202 to perform one or more operations to route network data based on social connections of users. For example, as will be described in greater detail below, partitioning module 104 may cause computing device 202 to partition, based on a social graph representative of social connections among a plurality of users of a social networking system (e.g., social graph data 142), the plurality of users into a plurality of user buckets (e.g., user bucket 206-1, user bucket 206-2, user bucket 206-3, . . . user bucket 206-N). In some examples, each user bucket may include at least one user of the social networking system.

Additionally, selecting module 106 may cause computing device 202 to select a set of user buckets from the plurality of user buckets (e.g., one or more of user buckets 206). Furthermore, assigning module 108 may cause computing device 202 to assign the set of user buckets (e.g., one or more of user buckets 206) to a data center included in a networking infrastructure (e.g., to at least one of data centers 164). Moreover, routing module 110 may cause computing device 202 to route data sent from a user device associated with a user included in the set of user buckets (e.g., a user device associated with a user included in a user bucket 206) to the data center (e.g., at least one of data centers 164).

Computing device 202 generally represents any type or form of computing device capable of reading and/or executing computer-executable instructions. Examples of computing device 202 may include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between computing device 202 and/or one or more elements included in networking infrastructure 160. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, a Fifth Generation (5G) network etc.), universal serial bus (USB) connections, and the like. Network 204 may facilitate communication or data transfer using wireless or wired connections. In one embodiment, network 204 may facilitate communication between computing device 202 and one or more elements of networking infrastructure 160.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to route network data based on social connections of users.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may partition, based on a social graph representative of social connections among a plurality of users of a social networking system, the plurality of users into a plurality of user buckets, each user bucket comprising at least one user of the social networking system. For example, partitioning module 104 may, as part of computing device 202, cause computing device 202 to partition, based on social graph data 142, a plurality of users of a social networking system into user buckets 206 (e.g., user bucket 206-1, user bucket 206-2, user bucket 206-3, . . . user bucket 206-N). Each user bucket 206 may include at least one user of the social networking system.

Partitioning module 104 may partition social graph data 142 in a variety of contexts. For example, as mentioned briefly above, social graph data 142 may include data representative of a social graph that may include (1) at least two graph nodes, and (2) at least one graph edge. Each of the graph nodes may be representative of a different user or set of users of the social networking system, and each graph edge may be representative of a social connection between at least two graph nodes.

In some examples, as will be described in greater detail below in reference to FIG. 6, partitioning module 104 may partition a plurality of users included in and/or represented by social graph data 142 into a plurality of user buckets (e.g., user buckets 206) by arranging a social graph included in and/or represented by social graph data 142 into a complete binary tree. Each leaf node in such a complete binary tree may correspond to a graph node included in the social graph (e.g., a user bucket).

Partitioning module 104 may arrange, construct, generate, and/or assemble the complete binary tree complete binary tree based on a Social Hash algorithm, where partitioning module 104 may construct the complete binary tree by successively partitioning the social graph such that partitioning module 104 may minimize a number of edges that may be bisected during each successive partition of the social graph. Levels of the complete binary tree may be represented as L, where L=[0, H] and H represents the height of the tree. The level L=0 may include a single head node representing all users included in the social graph. There may be $2^H$ leaf nodes at level L=H, where each leaf node may represent a predetermined portion of users included in the social graph. For example, each leaf node may represent a user bucket that includes 0.01% of users included in the social graph. Partitioning module 104 may generate $2^{L+1}$ nodes for level L+1 of the complete binary tree by performing $2^L$ balanced bipartitions (e.g., at least one balanced bipartition) that minimize edge cut of the $2^L$ nodes in level L.

Partitioning module 104 may partition the plurality of users included in and/or represented by social graph data 142 into a plurality of user buckets periodically (e.g., in accordance with any suitable period such as hourly, daily, weekly, monthly, etc.) to adapt to changes in the social graph. To limit an amount of rerouting that may occur due to such changes, partitioning module 104 may limit a difference between the plurality of user buckets and a previous partitioning of the plurality of users into a different plurality of users buckets to less than a threshold difference. For example, partitioning module 104 may limit movement of users between user buckets to less than 1% of users, 5% of users, 10% of users, 20% of users, and so forth.

Returning to FIG. 3, at step 320, one or more of the systems described herein may select a set of user buckets from the plurality of user buckets. For example, selecting module 106 may, as part of computing device 202, cause computing device 202 to select a set of user buckets from from the plurality of user buckets 206. For example, selecting module 106 may select a set of user buckets from plurality of user buckets 206 that may include any of user bucket 206-1, user bucket 206-2, user bucket 206-2, user bucket 206-N, and so forth.

Selecting module 106 may select a set of user buckets from plurality of user buckets 162 in a variety of contexts. For example, selecting module 106 may select a set of user buckets by identifying, from the plurality of user buckets, at least one user bucket that belongs to a level or segment of the complete binary tree described above. Selecting module 106 may further include the identified user bucket in the set of user buckets. In some examples, selecting module 106 may additionally or alternatively determine a degree of connectedness between a first user bucket and a second user bucket, and may identify and include the first user bucket and the second user bucket in the set of user buckets based on the determined degree of "connectedness" between the one or more user buckets. Additionally or alternatively, selecting module 106 may determine a degree of connectedness of a user bucket to an additional user bucket included in a level or segment of the complete binary tree (e.g., as described above). Selecting module 106 may identify and/or include the user bucket in a set of user buckets based on a degree of connectedness between the user bucket and the additional user bucket included in the level or segment of user buckets.

By way of illustration, a segment of a complete binary tree may include four user buckets at a first level of the complete binary tree and a fifth user bucket at a second level of the complete binary tree. Selecting module 106 may identify the first four user buckets as being on the first level of the complete binary tree and/or may determine that the first four user buckets have greater than a threshold level of connectedness with one another. Based on this identification and/or determination, selecting module 106 may include the first four user buckets in a set of user buckets. Furthermore, selecting module 106 may additionally identify the fifth user bucket as, although at a different level of the complete binary tree than the first four user buckets, having greater than a threshold level of connectedness with the first four user buckets. Based on this identification and/or determination, selecting module 106 may include the fifth user bucket in the set of user buckets that also includes the first four user buckets. Additional examples and explanations of ways selecting module 106 may select a set of user buckets from plurality of user buckets 162 will be described below in reference to FIG. 6.

Returning to FIG. 3, at step 330, one or more of the systems described herein may assign the set of user buckets to a data center included in a networking infrastructure. For example, assigning module 108 may, as part of computing device 202, cause user device 202 to assign the set of user buckets to a data center 164 included in networking infrastructure 160.

Assigning module 108 may assign the set of user buckets to a data center 164 included in networking infrastructure 160 in any suitable way. For example, assigning module 108 may assign the set of user buckets to the data center 162 included in a networking infrastructure by assigning the set of user buckets to the data center based on a Consistent Mapping algorithm.

A Consistent Mapping algorithm may preserve bucket locality by assigning a level or segment of buckets in the community hierarchy to the same data center (e.g., the same data center included in data centers 164). Assigning module 108 may, for each data center, generate a permutation (P) of the segments which may establish that data center's preference for segments. Assigning module 108 may further create tuples (T) for every (data center, user bucket) pair that may begin with the data center's preference for a segment that may include the user bucket. Assigning module 108 may further sort the tuples lexicographically in the order of preference, data center, and user bucket. Assigning module 108 may then traverse the user buckets in this lexicographic order and may greedily assign user buckets to data centers until each data center reaches a predetermined weight of traffic associated with the data center.

By way of illustration, FIG. 4 includes a listing 400 of pseudocode describing at least part of an example Consistent Mapping algorithm. As shown in listing 400, B may be a list of user buckets, D may be a list of data center names, $W_B$ may be a list of user bucket weights, $W_D$ may be a list of data center weights, S may be a number of segments, and T may be a list of tuples that may be assigned or initialized to a null or empty value (e.g., 0).

Although illustrated as lists in FIG. 4, any and all data elements recited and/or utilized in a Consistent Mapping algorithm as shown in listing 400 may include and/or be represented by any suitable data structure(s). In some examples, a "data structure" may include any suitable data organization, management, and/or storage format that may enable access to and/or modification of a body of data values. Examples of data structures may include, without limitation, arrays, lists, dictionaries, records, unions, graphs, binary trees, and so forth. For example, B may be a list of identifiers that may each identify a different user bucket included in user buckets 206, D may be a list of identifiers that may each identify a different data center included in data centers 164, and so forth.

In some examples, a position (e.g., an absolute position and/or a relative position) of a user bucket within data structure B may indicate a degree of connectedness between that user bucket and an additional user bucket within data structure B. For example, data structure B may be represented (e.g., within memory 120) as an array of n elements where each element may be indexed or referenced by an index value i that may be in a range from 0 to n−1. In other words, expression B[0] may indicate a first user bucket, B[1] may indicate a second user bucket, B[n−1] may indicate a final user bucket, and so forth. In this example, user bucket B[0] may include users that have a higher (e.g., absolutely and/or proportionally higher) degree of connectedness with one or more users included in user bucket B[1] than with one or more users included in user bucket B[n−1]. Likewise, one or more users within user bucket B[1] may have a higher (e.g., absolutely and/or proportionally higher) degree of connectedness with one or more users within user bucket B[n−1] than one or more users within user bucket B[0] may have with one or more users within B[n−1].

As further illustrated in listing 400, assigning module 108 may, in accordance with a Consistent Mapping algorithm, for each data center d included in a list of data centers D, determine a permutation P of preference values for each segment of user buckets included in a plurality of segments of user buckets. Permutation (P) may be an ordering of the list of segments (e.g., an array where position 0 in the array is a value indicating preference of a data center for segment 0). In some examples, a "permutation" may include an order or an arrangement of a set or number of items (e.g., values of one or more elements included in a data structure). In additional examples, a permutation may further include an act of ordering or arranging such a set or number of items. Thus, as shown in listing 400, assigning module 108 may assign a permutation of a number of segments S.

Assigning module 108 may assign the permutation P by executing any suitable function that may generate a permutation of the number of segments S. For example, assigning module 108 may execute a function PermutationWithSeed( ) that may accept the number of segments S and a data center name d as input values and may generate a permutation of the number of segments S using the data center name d as a seed (e.g., a seed for a random permutation generator function).

Continuing with listing 400, assigning module 108 may further, for each user bucket b in the list of buckets B, assign the user bucket b to a segment by determining a floor of a numeric representation of user bucket b (e.g., a user bucket identifier associated with user bucket b) multiplied by the length of list of buckets B and divided by the number of segments S. This may result in assigning module 108 grouping the user buckets (e.g., user buckets 206) into a plurality of segments of user buckets.

Furthermore, assigning module 108 may also generate, for each user bucket b included in list of user buckets B, a tuple that may include a preference factor from permutation P that may be associated with the segment that includes user bucket b and data center d. In other words, a tuple <P[segment], d,b> may indicate a preference factor (e.g., P[segment]) that data center d may have for a segment that may include user bucket b.

Continuing with the Consistent Mapping algorithm illustrated in listing 400, assigning module 108 may sort list of tuples T. For example, assigning module 108 may execute a function SortLexicographically (T) that may accept list of tuples T as an input and may sort list of tuples T lexicographically (e.g., by P[segment], then by data center name or identifier d, then by user bucket name or identifier b).

Assigning module 108 may additionally assign the set of user buckets to a data center based on the Consistent Mapping algorithm by assigning each user bucket to the data center based on the preference of the data center for each segment of user buckets included in the plurality of segments of user buckets. Continuing with listing 400, assigning module 108 may define a data structure A that may correlate or associate user buckets to data centers. For example, one or more of modules 102 (e.g., partitioning module 104) may have partitioned the plurality of users into n user buckets, and data structure A may be an array having n data elements, each data element corresponding to different user bucket included in the n user buckets.

For each tuple <preference, d,b> that exists in T, if the user bucket b included in the tuple does not exist in A (e.g., has not yet been assigned to a data center) and a weight factor associated with data center d (e.g., $W_D$[d]) is greater than 0, then assigning module 108 may assign the user bucket b to data center d. Assigning module 108 may then adjust the weight factor of data center d to account for an amount of traffic associated with user bucket b. This process may continue until assigning module 108 has assigned all user buckets included in B to a data center included in D. The Consistent Mapping function may then return data structure A that may relate user buckets to data centers.

Hence, in some examples, assigning module 108 may assign the set of user buckets to a data center based on the Consistent Mapping algorithm by (1) grouping the plurality of user buckets into a plurality of segments of user buckets, (2) determining, for each data center included in the networking infrastructure, a preference of the data center for each segment of user buckets included in the plurality of segments of user buckets, and (3) assigning each user bucket included in the set of user buckets to the data center based on the preference of the data center for each segment of user buckets included in the plurality of segments of user buckets.

Returning to FIG. 3, at step 340, one or more of the systems described herein may route data sent from a user device associated with a user included in the set of user buckets to the data center. For example, routing module 110 may, as part of computing device 202, cause computing device 202 to route data sent from a user device associated with a user included in the set of user buckets to a data center 164 included in networking infrastructure 164.

Figure 5:
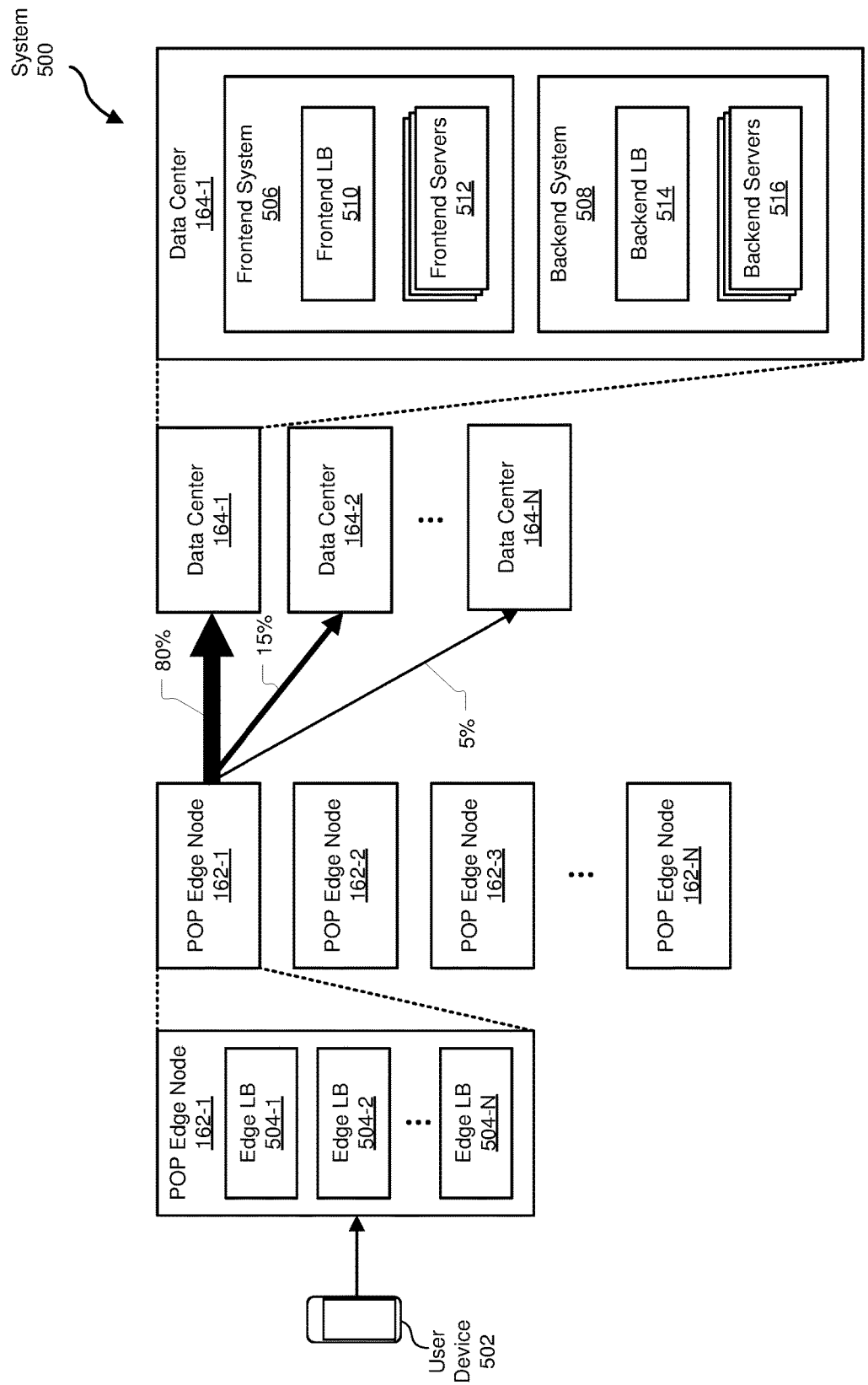
FIG. 5 is a block diagram of an example networking infrastructure that may implement portions of one or more example systems for routing network data based on social connections of users in accordance with some embodiments described herein.

By way of illustration, FIG. 5 shows an example system 500 that may include a user device 502, as well as a plurality of edge nodes 162 (e.g., edge node 162-1, edge node 162-2, edge node 162-3, edge node 162-N, etc.) and a plurality of data centers 164 (e.g., data center 164-1, data center 164-2, data center 164-N). As shown, user device 502 may be in communication with at least one POP edge node 162 (e.g., POP edge node 162-1), and each POP edge node 162 may be in communication with each data center 164 (e.g., data center 164-1, data center 164-2, data center 164-N, etc.).

Each POP edge node 162 may include at least one edge load balancer (also "Edge LB" herein). In some examples, a "load balancer" may include any hardware or software system that may distribute workloads (e.g., user requests, responses to user requests, data traffic, etc.) across multiple computing resources, such as computers, computer clusters, network links, central processing units, disk drives, and so forth. In the example shown in FIG. 4, edge LBs 504 may distribute any suitable workload received by POP edge node 162-1 across one or more data centers 164. As shown, POP edge node 162-1 may route eighty percent of a workload (e.g., requests received from user device 502 and/or any other source) to data center 164-1, fifteen percent to data center 164-2, and five percent to data center 164-N. The systems and methods described herein may route network data in accordance with such a predefined workload distribution.

For example, the systems and methods described in U.S. patent application Ser. No. 16/806,975, filed Mar. 2, 2020 and titled "SYSTEMS AND METHODS FOR DYNAMICALLY GENERATING ROUTING TABLES FOR EDGE NODES IN LARGE-SCALE NETWORKING INFRASTRUCTURES," the disclosure of which is incorporated herein in its entirety by this reference, may generate a routing table for each POP edge node 162. In some examples, the systems and methods described herein may route network data (e.g., from a user device 502 to a data center included in data centers 164) based on social connections of users in accordance with and/or based on such a predefined workload distribution that may be defined in and/or provided by such a generated routing table.

As further shown in FIG. 4, each data center 162 (e.g., data center 162-1, data center 162-2, data center 162-N, etc.) may further include a frontend system 506 and a backend system 508. Frontend system 506 may include any hardware or software system that may provide a frontend of a service. A "frontend" or "frontend of a service" may include any part of a service (e.g., a web service) that may be associated with a presentation layer of the service. For example, a frontend of a service may provide one or more user interfaces that a user may interact with when using the service. Frontend system 506 may further include at least one frontend load balancer 510 (also "frontend LB" herein) that may distribute workloads associated with a frontend of a service across multiple frontend servers 512. Frontend servers 512 may provide any suitable resources associated with a frontend of a service.

Likewise, backend system 508 may include any hardware or software system that may provide a backend of a service. A "backend" or "backend of a service" may include any part of a service (e.g., a web service) that may be associated with a data access layer of the service. For example, a backend of a service may provide logic and/or data storage associated with the service. Backend system 508 may further include at least one backend load balancer 514 (also "backend LB") herein that may distribute workloads associated with a backend of a service across multiple backend servers 516. Backend servers 516 may provide any suitable resources associated with a backend of a service.

As an illustration, a user of user device 502 may submit a user request to POP edge node 162-1 via user device 502. POP edge node 162-1 may receive the user request. One of edge load balancers 504 (e.g., edge load balancer 504-1) may route the user request to one of data centers 164, such as data center 164-1. Depending on whether the user request is for a frontend resource of a service or a backend resource of the service, frontend load balancer 510 may receive the user request and may route the user request to one of frontend servers 512 or backend load balancer 514 may receive the user request and may route the user request to one of backend servers 516. Data center 164-1 may then send a response to the user request back to user device 502 via a similar—though possibly reversed—path.

Routing module 110 may route data sent from a user device associated with a user included in the set of user buckets to the data center included in networking infrastructure 160 in a variety of contexts. For example, routing module 110 may receive an initial request from user device 502. Routing module 110 may associate the initial request with a user bucket included in the plurality of user buckets. For example, routing module 110 may determine that user device 502 is associated with a particular user and that the particular user is included in a user bucket as described herein, such as user bucket 206-1.

Routing module 110 may include a bucket identifier in the initial request and may identify a data center included in data centers 164 that assigning module 108 has assigned the user bucket that includes the particular user to. Routing module 110 may then route the user request to the identified data center. In some examples, routing module 110 may include a bucket identifier associated with the user bucket in a hypertext transfer protocol (HTTP) cookie associated with the user request. Routing module 110 may further receive a subsequent request from the user device that may include the bucket identifier and may route the subsequent request to the data center based on the bucket identifier. In at least this way, routing module 110 may identify the subsequent request and may route the subsequent request to the appropriate data center.

Figure 6:
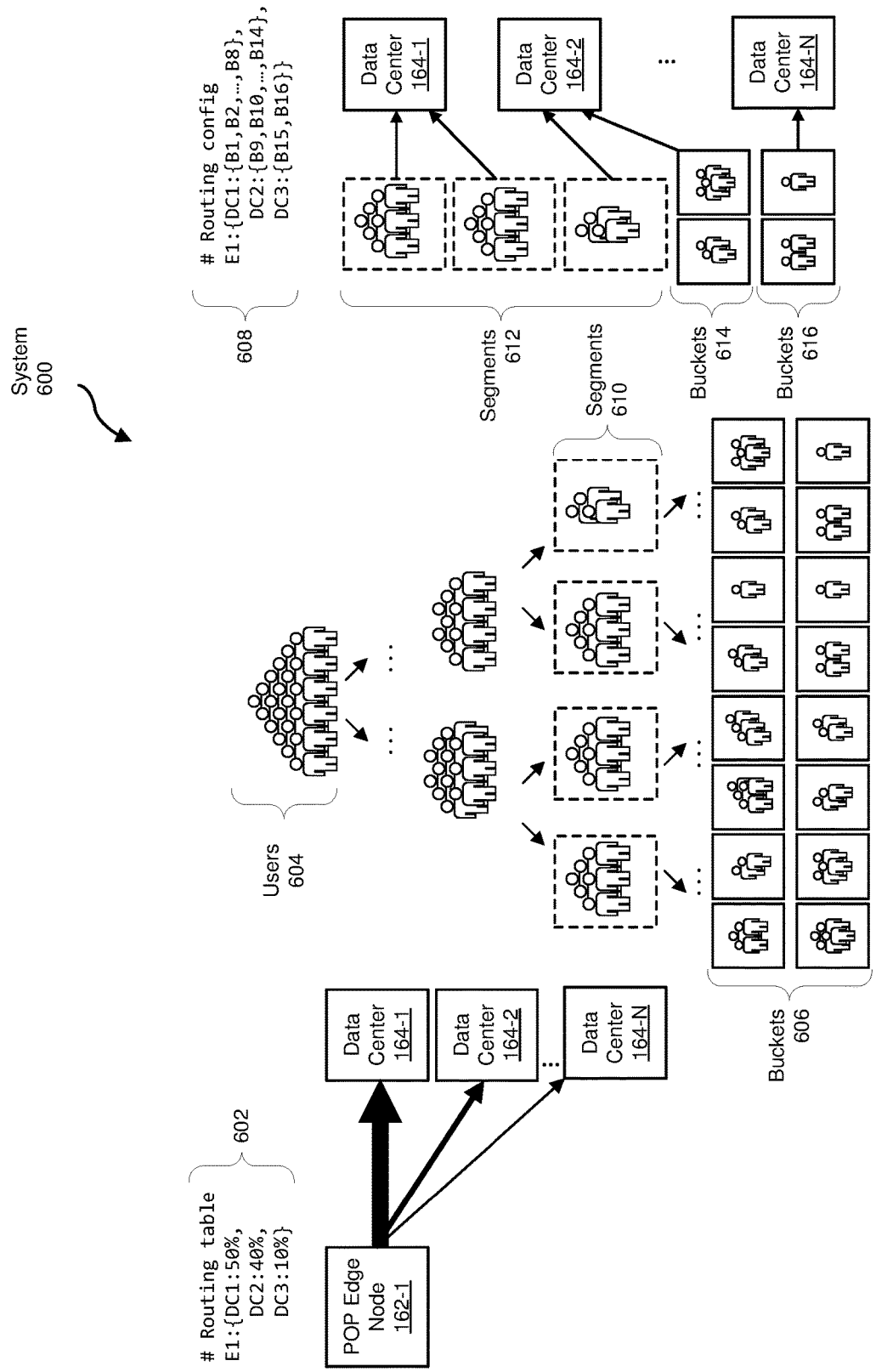
FIG. 6 is a block diagram that illustrates various elements of the systems and methods described herein.

FIG. 6 is a block diagram of an example system 600 that illustrates various elements of the systems and methods described herein, such as partitioning of a set of users into a set of user buckets and assigning user buckets to data centers. As shown, FIG. 6 includes POP edge node 162-1 that is configured to route predefined percentages of traffic it may receive to data centers 164 (e.g., data center 164-1, data center 164-2, . . . data center 164-N, etc.). Routing table 602 illustrates a possible example routing table for POP edge node 162-1 (indicated as "E1" in routing table 602). Routing table 602 indicates that POP edge node 162 may route fifty percent of user traffic to data center 164-1 (indicated as "DC1" in routing table 602), forty percent of user traffic to data center 164-2 (indicated as "DC2" in routing table 602), and ten percent of user traffic to data center 164-N (indicated as "DC3" in routing table 602).

FIG. 6 also shows a plurality of users 604. Users 604 may be users of a social networking system. As shown, one or more of the systems described herein (e.g., partitioning module 104) may partition users 604 into a plurality of user buckets 606. Each user bucket included in user buckets 606 may include at least one user included in users 604.

One or more of the systems described herein (e.g., selecting module 106, assigning module 108, etc.) may select a set of user buckets from user buckets 606 and may assign the selected set of user buckets to a data center (e.g., data center 164-1, data center 164-2, . . . data center 164-N, etc.). For example, as shown in FIG. 6, routing module 110 may access routing configuration 608 and may route data received by POP edge node 162-1 (indicated as "E1" in routing configuration 608) from users partitioned into sixteen user buckets (indicated by "B1" through "B16" in routing configuration 608) in accordance with routing configuration 608. Routing configuration 608 may cause routing module 110 to route data from users in user buckets B1 to B8 to a first data center (e.g., DC1 in routing configuration 608), data from users in user buckets B9 to B14 to a second data center (e.g., DC2 in routing configuration 608), and data from users in user buckets B15 and B16 to a third data center (e.g., DC3 in routing configuration 608).

In some examples, one or more of the systems described herein (e.g., assigning module 108) may group user buckets into a plurality of segments, such as segments 610 shown in FIG. 6. As described above, an inclusion of a user bucket in a segment may indicate a relatively high (e.g., greater than a threshold) degree of connectedness of users in the user bucket with other users included in the segment. Assigning module 108 may prefer assigning user buckets included in a segment to the same data center. For example, as shown in FIG. 6, each of segments 612, assigned to data center 164-1 and data center 164-2, may include multiple user buckets. However, assigning module 108 may assign user buckets to data centers independently of a grouping of the user buckets into segments. This may provide flexibility to the system while achieving many of the benefits of routing network data based on social connections of users as described herein. To illustrate, FIG. 6 indicates that user buckets 614 may be assigned to data center 164-2 and user buckets 616 may be assigned to data center 164-N.

As discussed throughout the instant disclosure, the disclosed systems and methods may provide one or more advantages over traditional options for routing network data. For example, by grouping traffic of highly connected users (e.g., within a social networking system) and then routing the traffic to the same data centers, embodiments of the systems and methods described herein may improve cache efficiency (e.g., hit rates). Other benefits may also include various backend optimizations such as a reduction in sharding of data (e.g., data accessed and/or served to a user via networking infrastructure 160). By way of illustration, some embodiments of the systems and methods described herein may consistently achieve a 75-80% connection locality and a reduction of 17% in query load on backend storage versus conventional routing options.

Example Embodiments

Example 1: A computer-implemented method comprising (1) receiving, via a monitoring infrastructure that monitors an operational state of a networking infrastructure, data representative of the operational state of the networking infrastructure during a period of time, the networking infrastructure comprising (a) a plurality of data centers, and (b) at least one point-of-presence (POP) edge node, (2) accessing data representative of a set of predefined policies associated with the networking infrastructure, (3) based on the data representative of the operational state of the networking infrastructure during the period of time (a) determining a set of data center load factors, each data center load factor in the set of data center load factors associated with a different data center in the plurality of data centers, and (b) generating, via a linear solver and further based the set of data center load factors and the set of predefined policies associated with the networking infrastructure, a routing table for the POP edge node.

Example 1: A computer-implemented method comprising (1) partitioning, based on a social graph representative of social connections among a plurality of users of a social networking system, the plurality of users into a plurality of user buckets, each user bucket comprising at least one user of the social networking system, (2) selecting a set of user buckets from the plurality of user buckets, (3) assigning the set of user buckets to a data center included in a networking infrastructure, and (4) routing data sent from a user device associated with a user included in the set of user buckets to the data center.

Example 2: The computer-implemented method of example 1, wherein (1) the networking infrastructure comprises (A) a plurality of data centers, and (B) at least one point-of-presence (POP) edge node, (2) the data center is included in the plurality of data centers, (3) the computer-implemented method further comprises receiving data representative of a routing table that indicates an amount of traffic received by the POP edge node that the POP edge node routes to the data center, and (4) routing the data sent from the user device associated with the user included in the set of user buckets to the data center comprises routing the data sent from the user device from the POP edge node to the data center in accordance with the routing table.

Example 3: The computer-implemented method of example 2, wherein the routing table indicates a fraction of data received by the POP edge node that the POP edge node routes the data center.

Example 4: The computer-implemented method of any of examples 1-3, wherein the social graph comprises (1) at least two graph nodes, each graph node representative of a different set of users of the social networking system, and (2) at least one graph edge, each graph edge representative of a social connection between the at least two graph nodes.

Example 5: The computer-implemented method of example 4, wherein partitioning the plurality of users into the plurality of user buckets comprises arranging the social graph into a complete binary tree, wherein each leaf node in the complete binary tree corresponds to a different graph node included in the social graph.

Example 6: The computer-implemented method of example 5, wherein arranging the social graph into the complete binary tree comprises constructing the complete binary tree based on the social graph in accordance with a Social Hash algorithm.

Example 7: The computer-implemented method of any of examples 5 or 6, wherein partitioning the plurality of users into the plurality of user buckets further comprises performing at least one balanced bipartition of the complete binary tree.

Example 8: The computer-implemented method of example 7, wherein performing the balanced bipartition of the complete binary tree comprises minimizing a number of graph edges bisected by the balanced bipartition.

Example 9: The computer-implemented method of any of examples 1-8, wherein partitioning the plurality of users into the plurality of user buckets comprises limiting a difference between the plurality of user buckets and a previous partitioning of the plurality of users into a different plurality of users buckets to less than a threshold difference.

Example 10: The computer-implemented method of any of examples 1-9, wherein assigning the set of user buckets to the data center included in a networking infrastructure comprises assigning the set of user buckets to the data center based on a Consistent Mapping algorithm.

Example 11: The computer-implemented method of example 10, wherein assigning the set of user buckets to the data center based on the Consistent Mapping algorithm comprises (1) grouping the plurality of user buckets into a plurality of segments of user buckets, (2) determining, for each data center included in the networking infrastructure, a preference of the data center for each segment of user buckets included in the plurality of segments of user buckets, and (3) assigning each user bucket included in the set of user buckets to the data center based on the preference of the data center for each segment of user buckets included in the plurality of segments of user buckets.

Example 12: The computer-implemented method of any of examples 1-11, wherein routing data sent from the user device associated with the user included in the set of user buckets to the data center comprises (1) receiving an initial request from the user device, (2) associating the initial request with a user bucket included in the plurality of user buckets, (3) including a bucket identifier associated with the user bucket in a hypertext transfer protocol (HTTP) cookie associated with the initial request, (4) receiving a subsequent request from the user device that includes the bucket identifier, and (5) routing the subsequent request to the data center based on the bucket identifier.

Example 13: A system comprising (1) a partitioning module, stored in memory, that partitions, based on a social graph representative of social connections among a plurality of users of a social networking system, the plurality of users into a plurality of user buckets, each user bucket comprising at least one user of the social networking system, (2) a selecting module, stored in memory, that selects a set of user buckets from the plurality of user buckets, (3) an assigning module, stored in memory, that assigns the set of user buckets to a data center included in a networking infrastructure, (4) a routing module, stored in memory, that routes data sent from a user device associated with a user included in the set of user buckets to the data center, and (5) at least one physical processor that executes the partitioning module, the selecting module, the assigning module, and the routing module.

Example 14: The system of example 13, wherein (1) the networking infrastructure comprises (a) a plurality of data centers, and (b) at least one point-of-presence (POP) edge node, (2) the data center is included in the plurality of data centers, (3) the routing module further receives data representative of a routing table that indicates an amount of traffic received by the POP edge node that the POP edge node routes to the data center, and (4) the routing module routes the data sent from the user device associated with the user included in the set of user buckets to the data center by routing the data sent from the user device from the POP edge node to the data center in accordance with the routing table.

Example 15: The system of any of example 13 or 14, wherein (1) the social graph comprises (a) at least two graph nodes, each graph node representative of a different set of users of the social networking system, and (b) at least one graph edge, each graph edge representative of a social connection between the at least two graph nodes, and (2) the partitioning module partitions the plurality of users into the plurality of user buckets by arranging the social graph into a complete binary tree, wherein each leaf node in the complete binary tree corresponds to a different graph node included in the social graph.

Example 16: The system of example 15, wherein the partitioning module arranges the social graph into the complete binary tree by constructing the complete binary tree based on the social graph in accordance with a Social Hash algorithm.

Example 17: The system of any of examples 13-16, wherein the partitioning module partitions the plurality of users into the plurality of user buckets by limiting a difference between the plurality of user buckets and a previous partitioning of the plurality of users into a different plurality of users buckets to less than a threshold difference.

Example 18: The system of any of examples 13-17, wherein the assigning module assigns the set of user buckets to the data center included in a networking infrastructure comprises assigning the set of user buckets to the data center based on a Consistent Mapping algorithm.

Example 19: The system of any of examples 13-18, wherein the routing module routes data sent from the user device associated with the user included in the set of user buckets to the data center by (1) receiving an initial request from the user device, (2) associating the initial request with a user bucket included in the plurality of user buckets, (3) including a bucket identifier associated with the user bucket in a hypertext transfer protocol (HTTP) cookie associated with the initial request, (4) receiving a subsequent request from the user device that includes the bucket identifier, and (5) routing the subsequent request to the data center based on the bucket identifier.

Example 20: A non-transitory computer-readable medium comprising computer-readable instructions that, when executed by at least one processor of a computing system, cause the computing system to (1) partition, based on a social graph representative of social connections among a plurality of users of a social networking system, the plurality of users into a plurality of user buckets, each user bucket comprising at least one user of the social networking system, (2) select a set of user buckets from the plurality of user buckets, (3) assign the set of user buckets to a data center included in a networking infrastructure, and (4) route data sent from a user device associated with a user included in the set of user buckets to the data center.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive social graph data to be transformed. The social graph data may be representative of social connections among a plurality of users of a social networking system to be transformed. One or more of the modules recited herein may transform the social graph data, output a result of the transformation to partition a plurality of users into a plurality of user buckets, use the result of the transformation to select a set of user buckets from the set of user buckets and/or assign the set of user buckets to a data center included in a networking infrastructure, and store the result of the transformation to route data sent from a user device associated with a user included in the set of user buckets to the data center. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" and/or "non-transitory computer-readable medium" may generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    partitioning, based on a social graph representative of social connections among a plurality of users of a social networking system, the plurality of users into a plurality of user buckets, each user bucket comprising at least one user of the social networking system;
    selecting a set of user buckets from the plurality of user buckets;
    within a networking infrastructure comprising a plurality of data centers and at least one point-of-presence (POP) edge node, assigning the set of user buckets to one of the data centers the plurality of data centers;
    receiving a routing table indicating an amount of traffic received by the POP edge node that the POP edge node routes to the data center; and
    routing data sent from a user device associated with a user included in the set of user buckets to the data center via the POP edge node in accordance with the routing table.

2. The computer-implemented method of claim 1, wherein the routing table indicates a fraction of data received by the POP edge node that the POP edge node routes the data center.

3. The computer-implemented method of claim 1, wherein the social graph comprises:
    at least two graph nodes, each graph node representative of a different set of users of the social networking system; and
    at least one graph edge, each graph edge representative of a social connection between the at least two graph nodes.

4. The computer-implemented method of claim 3, wherein partitioning the plurality of users into the plurality of user buckets comprises arranging the social graph into a complete binary tree, wherein each leaf node in the complete binary tree corresponds to a different graph node included in the social graph.

5. The computer-implemented method of claim 4, wherein arranging the social graph into the complete binary tree comprises constructing the complete binary tree based on the social graph in accordance with a Social Hash algorithm.

6. The computer-implemented method of claim 4, wherein partitioning the plurality of users into the plurality of user buckets further comprises performing at least one balanced bipartition of the complete binary tree.

7. The computer-implemented method of claim 6, wherein performing the balanced bipartition of the complete binary tree comprises minimizing a number of graph edges bisected by the balanced bipartition.

8. The computer-implemented method of claim 1, wherein partitioning the plurality of users into the plurality of user buckets comprises limiting a difference between the plurality of user buckets and a previous partitioning of the plurality of users into a different plurality of users buckets to less than a threshold difference.

9. The computer-implemented method of claim 1, wherein assigning the set of user buckets to the data center included in a networking infrastructure comprises assigning the set of user buckets to the data center based on a Consistent Mapping algorithm.

10. The computer-implemented method of claim 9, wherein assigning the set of user buckets to the data center based on the Consistent Mapping algorithm comprises:
    grouping the plurality of user buckets into a plurality of segments of user buckets;
    determining, for each data center included in the networking infrastructure, a preference of the data center for each segment of user buckets included in the plurality of segments of user buckets; and
    assigning each user bucket included in the set of user buckets to the data center based on the preference of the data center for each segment of user buckets included in the plurality of segments of user buckets.

11. The computer-implemented method of claim 1, wherein routing data sent from the user device associated with the user included in the set of user buckets to the data center comprises:
    receiving an initial request from the user device;
    associating the initial request with a user bucket included in the plurality of user buckets;
    including a bucket identifier associated with the user bucket in a hypertext transfer protocol (HTTP) cookie associated with the initial request;
    receiving a subsequent request from the user device that includes the bucket identifier; and
    routing the subsequent request to the data center based on the bucket identifier.

12. A system comprising:
    a partitioning module, stored in memory, that partitions, based on a social graph representative of social connections among a plurality of users of a social networking system, the plurality of users into a plurality of user buckets, each user bucket comprising at least one user of the social networking system;

a selecting module, stored in memory, that selects a set of user buckets from the plurality of user buckets;

an assigning module, stored in memory, that, within a networking infrastructure comprising a plurality of data centers and at least one point-of-presence (POP) edge node, assigns the set of user buckets to one of the data centers in the plurality of data centers;

a routing module, stored in memory, that:
  receives a routing table that indicates an amount of traffic received by the POP edge node that the POP edge node routes to the data center; and
  routes data sent from a user device associated with a user included in the set of user buckets to the data center via the POP edge node in accordance with the routing table; and at least one physical processor that executes the partitioning module, the selecting module, the assigning module, and the routing module.

13. The system of claim 12, wherein:

the social graph comprises:
  at least two graph nodes, each graph node representative of a different set of users of the social networking system; and
  at least one graph edge, each graph edge representative of a social connection between the at least two graph nodes; and the partitioning module partitions the plurality of users into the plurality of user buckets by arranging the social graph into a complete binary tree, wherein each leaf node in the complete binary tree corresponds to a different graph node included in the social graph.

14. The system of claim 13, wherein the partitioning module arranges the social graph into the complete binary tree by constructing the complete binary tree based on the social graph in accordance with a Social Hash algorithm.

15. The system of claim 12, wherein the partitioning module partitions the plurality of users into the plurality of user buckets by limiting a difference between the plurality of user buckets and a previous partitioning of the plurality of users into a different plurality of users buckets to less than a threshold difference.

16. The system of claim 12, wherein the assigning module assigns the set of user buckets to the data center included in a networking infrastructure comprises assigning the set of user buckets to the data center based on a Consistent Mapping algorithm.

17. The system of claim 12, wherein the routing module routes data sent from the user device associated with the user included in the set of user buckets to the data center by:
  receiving an initial request from the user device;
  associating the initial request with a user bucket included in the plurality of user buckets;
  including a bucket identifier associated with the user bucket in a hypertext transfer protocol (HTTP) cookie associated with the initial request;
  receiving a subsequent request from the user device that includes the bucket identifier; and
  routing the subsequent request to the data center based on the bucket identifier.

18. A non-transitory computer-readable medium comprising computer-readable instructions that, when executed by at least one processor of a computing system, cause the computing system to:
  partition, based on a social graph representative of social connections among a plurality of users of a social networking system, the plurality of users into a plurality of user buckets, each user bucket comprising at least one user of the social networking system;
  select a set of user buckets from the plurality of user buckets;
  within a networking infrastructure comprising a plurality of data centers and at least one point-of-presence (POP) edge node, assign the set of user buckets to one of the data centers in the plurality of data centers;
  receive a routing table indicating an amount of traffic received by the POP edge node that the POP edge node routes to the data center; and
  route data sent from a user device associated with a user included in the set of user buckets to the data center.

19. The computer-readable medium of claim 18, wherein:

the social graph comprises:
  at least two graph nodes, each graph node representative of a different set of users of the social networking system; and
  at least one graph edge, each graph edge representative of a social connection between the at least two graph nodes; and the computer-readable instructions, when executed by the at least one processor of the computing system, further cause the computing system to:
  partition the plurality of users into the plurality of user buckets by arranging the social graph into a complete binary tree, wherein each leaf node in the complete binary tree corresponds to a different graph node included in the social graph.

20. The computer-readable medium of claim 18, wherein the computer-readable instructions, when executed by the at least one processor of the computing system, further cause the computing system to partition the plurality of users into the plurality of user buckets by limiting a difference between the plurality of user buckets and a previous partitioning of the plurality of users into a different plurality of users buckets to less than a threshold difference.

* * * * *